(12) United States Patent
Igarashi (10) Patent No.: US 7,779,066 B2
(45) Date of Patent: Aug. 17, 2010

(54) INFORMATION DISTRIBUTING DEVICE, SYSTEM AND METHOD

(75) Inventor: Kaoru Igarashi, Tokyo (JP)

(73) Assignees: Pioneer Corporation, Tokyo (JP); Increment P. Corporation, Tokyo (JP)

( * ) Notice: Subject to any disclaimer, the term of this patent is extended or adjusted under 35 U.S.C. 154(b) by 2099 days.

(21) Appl. No.: 10/172,998

(22) Filed: Jun. 18, 2002

(65) Prior Publication Data

US 2003/0018713 A1 Jan. 23, 2003

(30) Foreign Application Priority Data

Jun. 28, 2001 (JP) ............................. 2001-195852

(51) Int. Cl.
 *G06F 15/16* (2006.01)
(52) U.S. Cl. ..................... 709/203; 709/201; 709/217
(58) Field of Classification Search ................ 701/117, 701/200–201, 206–209; 709/201–203, 206, 709/217–219; 455/456.1
See application file for complete search history.

(56) References Cited

U.S. PATENT DOCUMENTS

| | | | | |
|---|---|---|---|---|
| 5,832,406 A * | 11/1998 | Iwami et al. | ................. | 701/202 |
| 6,240,364 B1 * | 5/2001 | Kerner et al. | ................. | 701/210 |
| 6,278,942 B1 * | 8/2001 | McDonough | ................. | 701/210 |
| 6,298,302 B2 * | 10/2001 | Walgers et al. | ................. | 701/209 |
| 6,304,816 B1 * | 10/2001 | Berstis | ................. | 701/117 |
| 6,334,086 B1 * | 12/2001 | Park et al. | ................. | 701/117 |
| 6,339,746 B1 * | 1/2002 | Sugiyama et al. | ........... | 701/209 |
| 6,415,224 B1 * | 7/2002 | Wako et al. | ................. | 701/208 |
| 6,470,266 B1 * | 10/2002 | Ito et al. | ................. | 701/209 |
| 6,490,522 B2 * | 12/2002 | Sugiyama et al. | ........... | 701/211 |
| 6,526,351 B2 * | 2/2003 | Whitham | ................. | 701/211 |
| 6,597,986 B2 * | 7/2003 | Mikame | ................. | 701/211 |
| 6,603,405 B2 * | 8/2003 | Smith | ................. | 340/905 |
| 6,622,082 B1 * | 9/2003 | Schmidt et al. | ............. | 701/117 |
| 6,640,185 B2 * | 10/2003 | Yokota et al. | ............... | 701/208 |
| 6,687,613 B2 * | 2/2004 | Yokota | ................. | 701/209 |
| 6,716,101 B1 * | 4/2004 | Meadows et al. | ......... | 455/456.1 |
| 6,728,636 B2 * | 4/2004 | Kokojima et al. | ........... | 701/211 |
| 6,778,904 B2 * | 8/2004 | Iwami et al. | ................. | 701/211 |
| 6,801,763 B2 * | 10/2004 | Elsey et al. | ............... | 455/404.1 |
| 6,813,556 B2 * | 11/2004 | Watanabe | ................. | 701/117 |

(Continued)

FOREIGN PATENT DOCUMENTS

WO WO 97/10558 3/1997

(Continued)

OTHER PUBLICATIONS

European Search Report dated Nov.17, 2005.

*Primary Examiner*—Faruk Hamza
(74) *Attorney, Agent, or Firm*—McGinn IP Law Group PLLC (57) ABSTRACT

An information distributing machine distributes only information comparatively related to a user. The information distributing machine has a memory for storing a moving path of every user. The information distributing machine also has a distribution information entry unit for accepting distribution information including position information. A controller determines whether there is particular relationship between the moving path stored in the memory and the position information included in the distribution information. The information distribution machine transmits the distribution information to a user when there is the relationship between the moving path of that user and the position information.

28 Claims, 4 Drawing Sheets

U.S. PATENT DOCUMENTS

| | | | |
|---|---|---|---|
| 6,836,667 B1 * | 12/2004 | Smith, Jr. | 455/456.1 |
| 6,842,694 B2 * | 1/2005 | Irie | 701/208 |
| 6,847,889 B2 * | 1/2005 | Park et al. | 701/209 |
| 6,859,837 B2 * | 2/2005 | Watanabe et al. | 709/229 |
| 6,944,533 B2 * | 9/2005 | Kozak et al. | 701/200 |
| 7,031,832 B2 * | 4/2006 | Kawasaki et al. | 701/210 |
| 7,487,017 B1 * | 2/2009 | Bell et al. | 701/27 |
| 2003/0060978 A1 * | 3/2003 | Kokojima et al. | 701/211 |

FOREIGN PATENT DOCUMENTS

| | | |
|---|---|---|
| WO | WO 01/27790 A1 | 4/2001 |
| WO | WO 01/31510 A1 | 5/2001 |

* cited by examiner

PLEASE SELECT DESIRED INFORMATION TO BE DISTRIBUTED

|   |   | Yes | No |
|---|---|---|---|
| 1. | TRAFFIC INFORMATION | ○ | ○ |
| 2. | WEATHER INFORMATION | ○ | ○ |
| 3. | EVENT INFORMATION | ○ | ○ |
| 4. | GOURMET INFORMATION | ○ | ○ |

[ OK ]     [ Cancel ]

INFORMATION DISTRIBUTING DEVICE, SYSTEM AND METHOD

BACKGROUND OF THE INVENTION

1. Field of the Invention

The present invention relates to information distributing device, system and method based on a moving path of a user.

2. Description of the Related Art

An information distributing system for distributing various type of information to a user (or users) possessing a terminal unit such as a portable telephone (cellular phone) and a personal computer by using an electronic mail (e-mail) is well known. In such a conventional information distributing system, for example, the user can select desirable information to be distributed to the user through a Web page in advance. Such selection is made, for instance, when the user registers in a distribution service.

However, information unnecessary for the user is often distributed even in such an information distributing system that allows the user to select the information to be distributed.

SUMMARY OF THE INVENTION

An object of the present invention is to provide information distributing device, system and method able to distribute (deliver) only information comparatively relative to a user.

According to one aspect of the present invention, there is provided an information distributing device comprising: a memory for storing a moving path (route of travel) of every user; a distribution information entry unit for accepting distribution information including position information; a determination unit for determining whether there is predetermined relationship between the moving path stored in the memory and the position information included in the distribution information; and a transmitting unit for transmitting the distribution information to the user when the determination unit determines that there is the relationship between the moving path and the position information. The information related to the moving path of the user is only distributed to the user since the moving path of the user is considered.

According to another aspect of the present invention, there is provided an information distributing method comprising the steps of: A) storing a moving path of every user; B) accepting distribution information including position information; C) determining whether there is predetermined relationship between the moving path stored in Step A and the position information included in the distribution information accepted in Step B; and D) transmitting the distribution information to the user when Step C determines that there is the relationship between the moving path and the position information included in the distribution information. It is possible to distribute only information related to the moving path of the user since the moving path of the user is considered.

According to still another aspect of the present invention, there is provided an information distributing system comprising: a memory for storing a moving path of a user who uses a terminal unit; a distribution information generating unit for generating distribution information including position information; a determination unit for determining whether there is predetermined relationship between the moving path stored in said memory and the position information included in said distribution information; and a transmitting unit for transmitting said distribution information to the terminal unit of the user when the determination unit determines that there is the predetermined relationship between the moving path and the position information. It is possible to distribute only information related to the moving path of the user since the moving path of the user is considered.

DETAILED DESCRIPTION OF THE INVENTION

An embodiment of the present invention will be described in detail with reference to the accompanying drawings.

Figure 1:
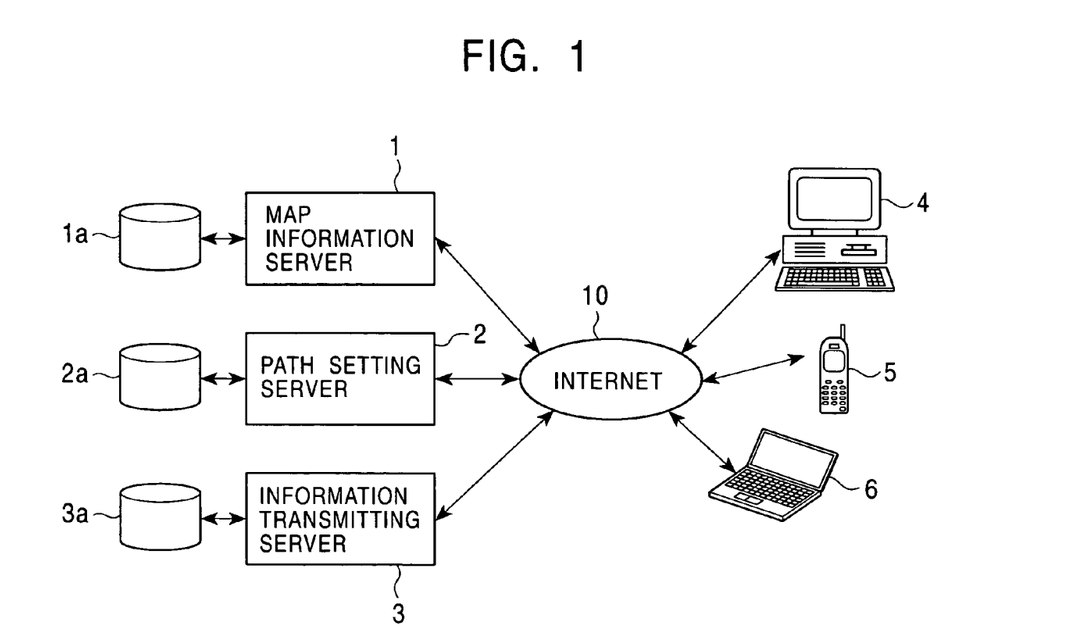
FIG. 1 is a block diagram schematically showing an information distributing system according to an embodiment of the present invention.

Referring to FIG. 1, a schematic construction of an information distributing system according to one embodiment of the present invention.

As shown in FIG. 1, the information distributing system has a map information server 1, a path setting server 2, an information transmitting server 3 and terminal units 4 to 6. These servers and terminal units can be connected to each other through the Internet 10. TCP/IP is used as a communication protocol between the servers, between the terminal units, or between the servers and the terminal units.

Each of the map information server 1, the path setting server 2 and the information transmitting server 3 is constructed by a computer for a server, and has a memory unit 1a, 2a, 3a for forming a database therein.

The map (geographical) information server 1 provides map data. The map data are stored in the memory 1a as the database in advance. The path setting server 2 sets (fixes, decides) the moving path of a user of each of the terminal units 4 to 6, and stores this moving path in the memory 2a together with user's information as the database. A memory area is formed in the database of the memory device 2a for every user. The memory area may be specified by a user name. The information transmitting server 3 is arranged in, for example, a shop and public facilities, and delivers information such as advertisement information, news and a weather forecast.

The terminal unit 4 is a fixed terminal unit, and may be a personal computer of a disk top type. The terminal unit 5 is a portable (mobile) telephone having an Internet connecting function. The terminal unit 6 is a portable terminal unit, and may be a personal computer of a compact notebook type. It should be noted that any suitable terminal units may be employed as the terminal units 4 to 6 as long as the terminal unit can connect to the Internet and receive an e-mail. The terminal units 4 to 6 may be utilized by fixed users. Alternatively, the terminal units 4 to 6 may be utilized by unspecific users.

Only the above terminal units 4 to 6 are not included in the information distributing system, but unillustrated many terminal units may be also included in the information distributing system.

In the information distributing system of such a construction, it is necessary for a user to register user's own information and moving path (route of travel) to the memory device 2a of the path setting server 2 in order to receive information from the information distributing server 3 through the Internet 10. The moving path is a path utilized by the user in the movement almost every day. For example, the moving path may be a commuting path and an attending school path.

An operation of the information distributing system will next be described when the user registers the moving path by using the terminal unit 4.

Figure 2:
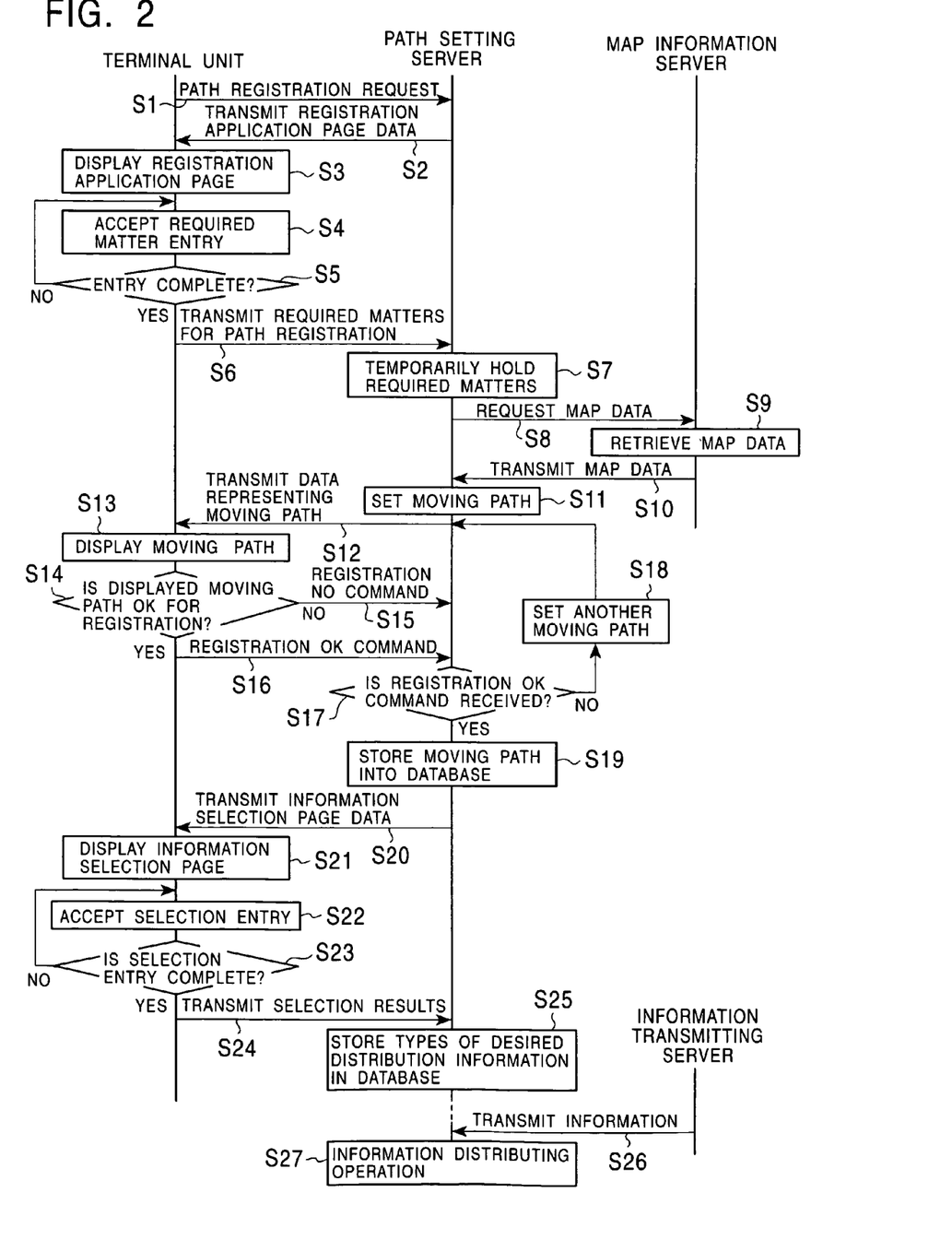
FIG. 2 shows operation sequences performed between servers and terminal unit in the information distributing system shown in FIG. 1.

Referring to FIG. 2, after the terminal unit 4 is connected to the Internet 10, the terminal unit 4 executes software for WWW browser, and sends a path registration request to the path setting server 2 (step S1). This path registration request is designated by a predetermined URL (uniform resource locator).

The path setting server 2 transmits registration application page data to the terminal unit 4 in response to the path registration request (step S2). The registration application page data are data for forming a picture image (display image, screen) to allow a user of the terminal unit 4 to input matters required in the path registration in accordance with the WWW browser. For example, the matters required in the path registration are a user name, an e-mail address of the user, a departing spot of the moving path, a destination spot of the moving path, a station used by the user on the way to the destination spot from the departing spot, and a routing point.

When the terminal unit 4 receives the registration application page data, the terminal unit 4 displays a picture image according to this registration application page data in a display through the WWW browser (step S3). The user inputs the above-mentioned matters required in the path registration from a keyboard by seeing the picture image displayed in the display. The terminal unit 4 receives these inputs (step S4), and determines whether the entry of the matters required in the path registration is complete or not (step S5). When all the necessary matters (data, information) are entered, these received matters are transmitted to the path setting server 2 (step S6).

When the path setting server 2 receives the matters required in the path registration, the path setting server 2 temporarily holds these matters (step S7), and sends a map data request to the map information server 1 (step S8). This request requires the map information server 1 to send back the map data of an area including the departing spot and the destination spot. Data of the departing spot and the destination spot are included in the map data request.

When the map information server 1 receives the map data request, the map information server 1 reads the map data corresponding to the departing spot and the destination spot included in this map data request by retrieving the map database stored in the memory device 1*a* (step S9). The map information server 1 then transmits the read map data to the path setting server 2 (step S10).

When the path setting server 2 receives the map data from the map information server 1, the path setting server 2 calculates and sets a moving path on the basis of matters such as a road, a railway, the departing spot, the destination spot, the ride-on station, the get-off station and the routing spot included in these map data (step S11). The data showing the decided moving path are transmitted from the path setting server 2 to the terminal unit 4 (step S12).

When the terminal unit 4 receives these data showing the moving path, the terminal unit 4 displays a picture image showing this moving path in the display through the WWW browser (step S13). If the displayed moving path is conformed to (matches) a desirable path, the user operates e.g., an "OK" button arranged on a displayed page (screen). This operation is also an operation for designating the registration of the displayed moving path. In contrast to this, when the displayed moving path is not conformed to the desirable path, the user operates e.g., a "NO" button arranged on the displayed page. The operating the OK/NO button is, for instance, clicking or touching the button.

The terminal unit 4 determines which button (OK or NO) is operated by the user (step S14), and confirms the right or wrong of the displayed moving path. When the "NO" button is operated, the terminal unit 4 transmits a registration NO command to the path setting server 2 (step S15). When the terminal unit 4 transmits the registration NO command, the terminal unit 4 receives and transmits a portion of the displayed moving path not conformed to the desirable path, or a routing spot for compensating this unconformity by a user's operation although this construction is not illustrated in the drawings. When the "OK" button is operated, a registration OK command is transmitted to the path setting server 2 (step S16).

The path setting server 2 determines the received command contents (step S17). When the path setting server 2 receives the registration NO command, the path setting server 2 calculates and sets a new moving path on the basis of information such as the routing spot received from the terminal unit 4 together with the moving path setting condition obtained so far (step S18). After the step S18 is executed, the program proceeds to the step S12 and repeats the above operations. In contrast to this, when the registration OK command is received, the moving path finally set in the step S11 or S18 is stored in the database of the memory device 2*a* together with the user name and the e-mail address (step S19). Thus, the moving path of the user who operates the terminal unit 4 has been registered.

Figure 3:
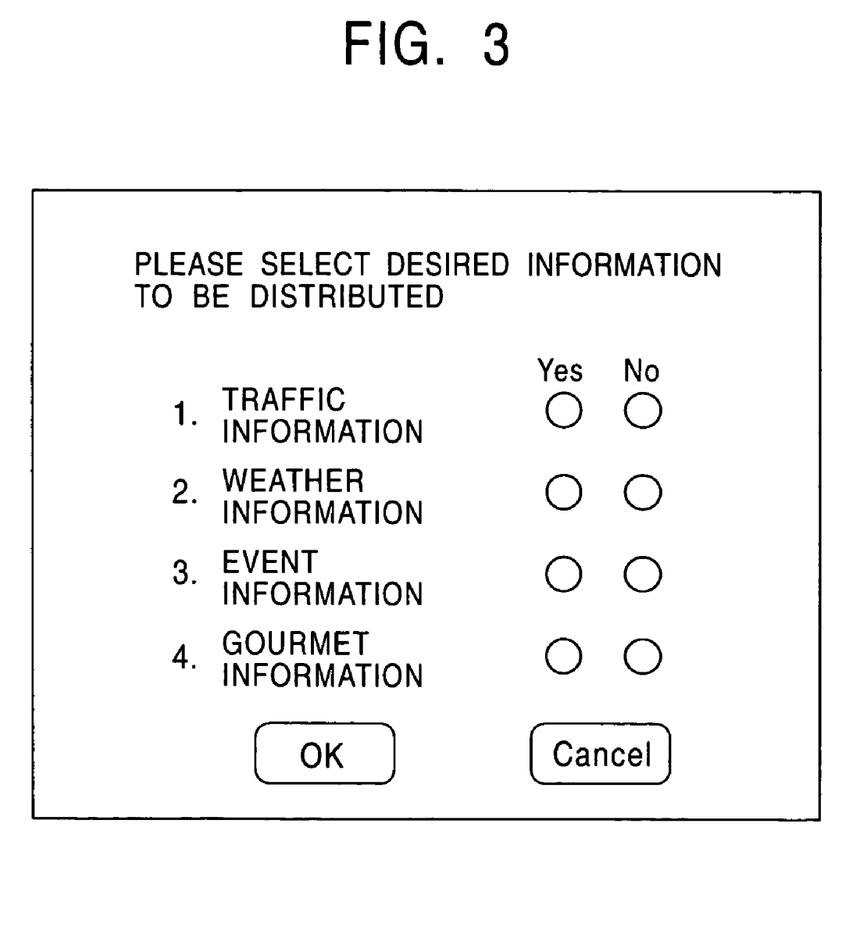
FIG. 3 shows a display example of an information selection page.

The path setting server 2 further transmits information selection page data (step S20). The information selection page data are data for forming a picture image, using the WWW browser, to allow the user to select desired item(s) for distribution to the user. For example, as shown in FIG. 3, this picture image shows a of plural information items such as traffic information, weather information, event information and gourmet information so that the user can select one or more items from these items by choosing "YES" or "NO" with a radio button. The display screen of FIG. 3 may also ask the user to enter personal information such as age, sex, occupation and hobbies.

When the terminal unit 4 receives the information selection page data, the terminal unit 4 displays a picture image corresponding to these information selection page data in the display through the WWW browser (step S21). The user sees the picture image (selection screen) displayed in the display, and operates the keyboard or mouse to select one or more items. The terminal unit 4 receives the selection input (step S22), and determines whether the selection input is complete (step S23). Completion of the selection input can be determined on the basis of a fact that the "OK" button is operated (e.g., pressed, touched or clicked). When the item selection is complete, the terminal unit 4 transmits the selection results to the path setting server 2 (step S24).

Upon receiving the selection results, the path setting server 2 stores the selection results, i.e., the types of information that the user wants to receive, into the database of the memory device 2*a* (step S25). In the memory device 2*a*, the types of desired information are written into a memory area of the database for each user, based on the user name.

The moving path and the kinds of desired distribution information for every user are registered by the above described moving path registering operation.

The information transmitting server 3 transmits delivery information to the path setting server 2 at a suitable time (step S26). The delivery information includes position information in addition to the types of the distribution information and its contents. The position information normally specifies a certain area (an address, a latitude, a longitude, or a road and a railway route) which relates to the contents of the distribution information, but the present invention is not limited in this regard. Specifically, the position information may be irrelevant to the contents of the distribution information.

Figure 4:
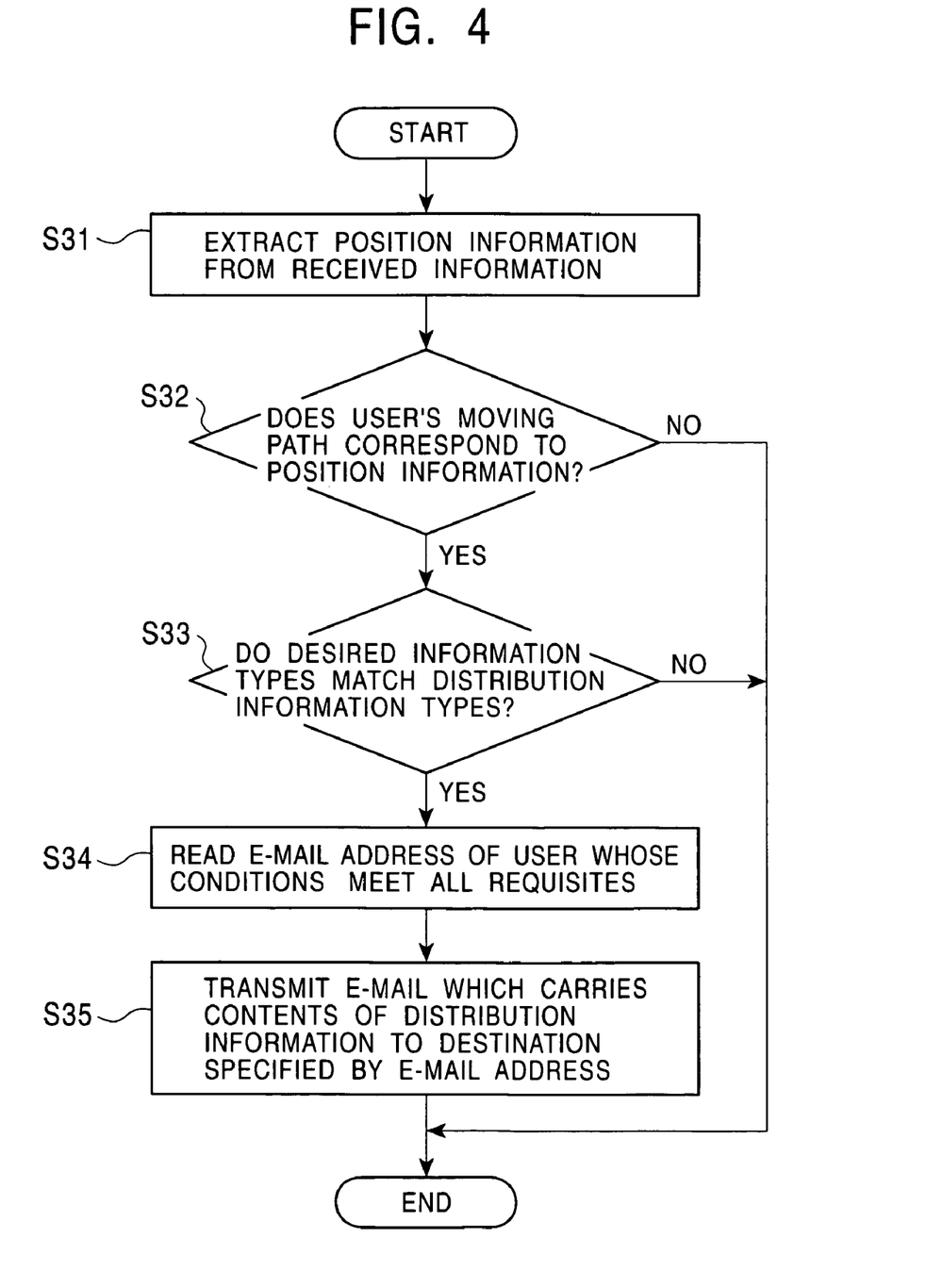
FIG. 4 is a flowchart showing an information distributing operation.

As the path setting server 2 receives the delivery information from the information transmitting server 3, the path setting server 2 performs an information distributing operation (step S27). Referring to FIG. 4 which illustrates the flowchart of the information distributing operation, the position information included in the received delivery information is first extracted (step S31), and it is determined whether a user of the moving path corresponding to this position information exists or not (step S32). Namely, it is determined whether or not there is a moving path related to an area specified by the position information among the moving paths stored in the memory device 2*a*. It should be noted here that the moving path corresponding to the position information may not always include the area specified by the position information. For example, it can be said that the moving path corresponds to the position information even if the moving path extends near the area specified by the position information. If there is certain relationship between the moving path and the position information, it is determined that the moving path corresponds to the position information.

When a user whose moving path corresponds to the position information is found, it is then determined whether or not the user's desired type of information matches the types of the distribution information (step S33). Specifically, when it is determined that the user's moving path corresponds to the position information, it is then determined whether any of the desired information items stored in the storage unit 2 matches any of the types of the distribution information available. If a plurality of users' moving paths correspond to the position information, step S33 is executed for each of such users. If the user's desired information type is the same as the distribution information type, the path setting server 2 reads the e-mail address of this user (step S34) and prepares an e-mail including the contents of the transmitting information, which is supplied from the server 3. The path setting server 2 then transmits the e-mail with this e-mail address as a destination address (step S35).

The e-mail is transferred to a terminal unit through the Internet 10. This terminal unit is a terminal unit operated by the user designated by the e-mail address included in the e-mail. For example, when this terminal unit is the terminal unit 4, this user's desired information is distributed to the terminal unit 4 by e-mail, and the contents of the information are displayed in the display of the terminal unit 4.

If the user has selected the weather information as the desired information, the weather information such as today's weather information for an area including the moving path of the user is distributed and displayed in the user's terminal unit. If the user has selected the traffic information, the traffic information such as an accident and a traffic jam in the moving path of the user is distributed and displayed in the user's terminal unit. In the user has selected the event information, the event information such as an entertainment show planed (sponsored) by a department store located in the moving path of the user is distributed and displayed in the user's terminal unit.

Even when the user does not exist along the registered moving path together with the portable terminal unit, the desired information may be also received by this portable terminal unit or a fixed terminal unit. To this end, the registration application page may include a sentence which asks the user a question such as "Do you want to have information delivered even when you are out of the registered moving path?".

It should be noted that the conditions used to determine whether the e-mail should be transmitted or not are not limited to those indicated in the steps S32 and S33. For example, the e-mail may be transmitted to a user only if other conditions such as sex, age and hobbies are met in addition to the criteria of steps S32 and S33.

It should be also noted that although the e-mail (i.e., distribution information) is transferred from the information transmitting server 3 to the user's terminal unit through the path setting server 2 in the illustrated embodiment, the e-mail may be directly transmitted from the information transmitting server 3 to the user's terminal unit without passing through the path setting server 2.

In the above embodiment, the time for distributing the e-mail (distribution information) to the terminal unit depends on the time for transmitting the distribution information from the information transmitting server 3, but the present invention is not limited in this regard. For instance, the distribution information may be also transmitted at one or more predetermined times in a day. The information may be also transmitted to the terminal unit when the terminal unit exists within the registered moving path.

The method of setting the moving path from the departing spot to the destination spot is not limited to the setting method shown in FIG. 2. For instance, a setting method as disclosed in Japanese Patent Laid-Open (Kokai) No. 2001-91292 may be employed, the entire disclosure of which is incorporated herein by reference.

This application is based on Japanese Patent Application No. 2001-195852 and the entire disclosure thereof is incorporated herein by reference.

What is claimed is:

1. An information distributing device comprising:
   a memory for storing a predetermined moving path of a user, the predetermined moving path being determined by the user;
   a distribution information entry unit for receiving distribution information from a remote source, the distribution information including position information;
   a determination unit for determining whether there is a predetermined relationship between the predetermined moving path stored in said memory and the position information included in the distribution information; and
   a transmitting unit responsive to said determination unit determining that there is the predetermined relationship between the predetermined moving path and the position information, for transmitting the distribution information to the user.

2. The information distributing device according to claim 1, wherein the position information specifies an area related to the distribution information.

3. The information distributing device according to claim 1, wherein said transmitting unit is configured to transmit the distribution information by e-mail.

4. The information distributing device according to claim 1, wherein said remote source comprises an information transmitting server.

5. The information distributing device according to claim 1 further comprising a moving path setting unit for calculating and setting the predetermined moving path on the basis of a departing spot and a destination spot designated by the user, and map data.

6. The information distributing device according to claim 5, wherein said moving path setting unit is configured to obtain the map data from a map information server.

7. The information distributing device according to claim 1, wherein the distribution information transmitted by said transmitting unit is configured to be received by a terminal unit.

8. The information distributing device according to claim 1, further comprising:
a request entry unit for receiving a request from the user, the request indicating a type of information which the user wants to receive, and a match detection unit for determining whether the indicated type of the information matches a type of the distribution information,
wherein said transmitting unit is responsive to the determination unit determining that there is the predetermined relationship between the user position information and the predetermined moving path and the match detection unit determining that the type of the information indicated in the request matches the type of the distribution information, to transmit the distribution information to the user.

9. An information distributing method comprising:
storing a predetermined moving path of a user, the predetermined path being determined by the user;
receiving distribution information from a remote source, the distribution information including position information;
determining whether there is a predetermined relationship between the stored predetermined moving path and the position information included in the distribution information; and
transmitting the distribution information to the user when said determining determines that there is the predetermined relationship between the predetermined moving path and the position information.

10. The information distributing method according to claim 9, wherein the position information specifies an area related to the distribution information.

11. The information distributing method according to claim 9, wherein the distribution information is transmitted to the user by e-mail.

12. The information distributing method according to claim 9 further comprising calculating and setting the predetermined moving path on the basis of a departing spot and a destination spot designated by the user, and map data, before storing the moving path.

13. The information distributing method according to claim 9, further comprising, before transmitting the distribution information to the user:
indicating a type of information which the user wants to receive; and
determining whether the indicated type of information matches a type of the distribution information,
wherein the distribution information is transmitted to the user when said determining determines that there is the predetermined relationship between the position information and the predetermined moving path and that the indicated type of information matches the type of the distribution information.

14. An information distributing system comprising:
a memory for storing a predetermined moving path of a user who uses a terminal unit, the predetermined moving path being determined by the user;
a distribution information generating unit for generating distribution information, the distribution information including position information;
a determination unit for determining whether there is a predetermined relationship between the predetermined moving path stored in said memory and the position information included in distribution information; and
a transmitting unit responsive to said determination unit determining that there is the predetermined relationship between the predetermined moving path and the position information, for transmitting the distribution information to the terminal unit of the user.

15. The information distributing system according to claim 14, wherein the position information specifies an area related to the distribution information.

16. The information distributing system according to claim 14, wherein said transmitting unit is configured to transmit the distribution information by e-mail.

17. The information distributing system according to claim 14 further comprising a moving path setting unit for calculating and setting the moving path on the basis of a departing spot and a destination spot designated by the user, and map data.

18. The information distributing system according to claim 17 further comprising a map information server for supplying the map data.

19. The information distributing system according to claim 14, wherein the distribution information transmitted by said transmitting unit is configured to be received by the terminal unit.

20. The information distributing system according to claim 14, further comprising:
a request entry unit that receives a request that indicates a type of information which the user wants to receive, and
a match detection unit for determining whether the indicated type of information matches a type of the distribution information,
wherein said transmitting unit is responsive to the determination unit determining that there is the predetermined relationship between the position information and the predetermined moving path and the match detection unit determining that the type of the information indicated in the request matches the type of the distribution information, to transmit the distribution information to the user.

21. The information distributing device according to claim 1, wherein the distribution information includes at least one of traffic information, weather information, event information, and gourmet information.

22. The information distributing method according to claim 9, wherein the distribution information includes at least one of traffic information, weather information, event information, and gourmet information.

23. The information distributing system according to claim 14, wherein the distribution information includes at least one of traffic information, weather information, event information, and gourmet information.

24. The information distributing device according to claim 1, wherein the predetermined moving path includes:
at least one of a moving path utilized by the user substantially every day, a commuting path, and an attending school path.

25. The information distributing device according to claim 1, wherein the predetermined moving path includes:
a railway station used by the user to travel from a predetermined departure location to a predetermined destination location.

26. The information distributing device according to claim 1, wherein the predetermined moving path includes:
at least one of a railway station, a railway route, ride-on station information, and get-off station information.

27. The information distributing device according to claim 1, wherein the predetermined moving path includes:
   road information, and
   at least one of a railway route, ride-on station information, and get-off station information.

28. The information distributing device according to claim 1, wherein the distribution information includes at least one of advertisement information, traffic information, and weather information.

* * * * *